(12) United States Patent
Andreas et al.

(10) Patent No.: US 9,229,912 B2
(45) Date of Patent: Jan. 5, 2016

(54) PREVIEWING PROMINENT FEATURES OF REMOTE DOCUMENTS

(71) Applicant: International Business Machines Corporation, Armonk, NY (US)

(72) Inventors: William S Andreas, Littleton, MA (US); Erik B Craig, Raleigh, NC (US); David K Grotjohn, Cary, NC (US); Janet E Mockler-Rowlatt, Markham (CA); Steven D Wood, Edinburgh (GB)

(73) Assignee: International Business Machines Corporation, Armonk, NY (US)

(*) Notice: Subject to any disclaimer, the term of this patent is extended or adjusted under 35 U.S.C. 154(b) by 391 days.

(21) Appl. No.: 13/721,750

(22) Filed: Dec. 20, 2012

(65) Prior Publication Data

US 2014/0181644 A1    Jun. 26, 2014

(51) Int. Cl.
  *G06F 17/20*     (2006.01)
  *G06F 17/21*     (2006.01)
  *G06F 17/22*     (2006.01)
  *G06F 17/30*     (2006.01)

(52) U.S. Cl.
  CPC .......... *G06F 17/212* (2013.01); *G06F 17/2241* (2013.01); *G06F 17/30902* (2013.01)

(58) Field of Classification Search
  CPC ........ G06F 9/4443; G06F 3/0481; G06F 8/38
  See application file for complete search history.

(56) References Cited

U.S. PATENT DOCUMENTS

| | | |
|---|---|---|
| 5,838,320 A | 11/1998 | Matthews, III et al. |
| 7,345,688 B2 | 3/2008 | Baudisch et al. |
| 2005/0091254 A1 | 4/2005 | Stabb et al. |
| 2005/0091612 A1* | 4/2005 | Stabb et al. ................... 715/816 |
| 2011/0113365 A1 | 5/2011 | Kimmerly et al. |
| 2011/0258575 A1 | 10/2011 | Cupp et al. |
| 2012/0011430 A1* | 1/2012 | Parker et al. ................... 715/234 |
| 2012/0144292 A1 | 6/2012 | Lee |

* cited by examiner

*Primary Examiner* — Stephen Hong
*Assistant Examiner* — Shahid Khan
(74) *Attorney, Agent, or Firm* — Jeffrey T. Holman

(57) ABSTRACT

A document previewing system includes a display device including a user interface and a document previewing engine coupled to the display device. The document previewing engine is configured to download an outline of a document including outline features and filler content in between the outline features. The filler content replaces secondary content of the document. The document previewing engine is further configured to display the outline on the display device, and download the secondary content corresponding to an outline feature in response to a user navigating to the outline feature and the outline feature displaying on the display device for a period of time.

20 Claims, 5 Drawing Sheets

PREVIEWING PROMINENT FEATURES OF REMOTE DOCUMENTS

BACKGROUND

Transmitting data over a network may be costly, time consuming, and unnecessarily consume bandwidth. Many users seek to reduce the amount of data downloaded onto devices because providers limit data usage or charge based data usage. In some instances, documents or data sets are too large to be loaded onto a local machine over a network without significant delay. A common solution is to download only a first portion of the document or data set while also providing the impression to the user that the entire document is loaded when it is not. Navigation further through the document or data set prompts a request for more data from the server and continues the download. While such a solution helps reduce unnecessary downloads, users only interested in information located in the middle or near the end of the document or data set still download more than needed as they navigate through the document. Additionally, users unnecessarily increase data usage that may be costly and time consuming.

SUMMARY

Embodiments of a system are described. In one embodiment, a document previewing system includes a display device including a user interface and a document previewing engine coupled to the display device. The document previewing engine is configured to download an outline of a document including outline features and filler content in between the outline features. The filler content replaces secondary content of the document. The document previewing engine is further configured to display the outline on the display device, and download the secondary content corresponding to an outline feature in response to a user navigating to the outline feature and the outline feature displaying on the display device for a period of time. Other embodiments of the system are also described, as well as embodiments of a computer program product and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 depicts one embodiment of an initial download of the document of

FIG. 3 including the outline features and filler content.

Throughout the description, similar reference numbers may be used to identify similar elements.

DETAILED DESCRIPTION

Figure 1:
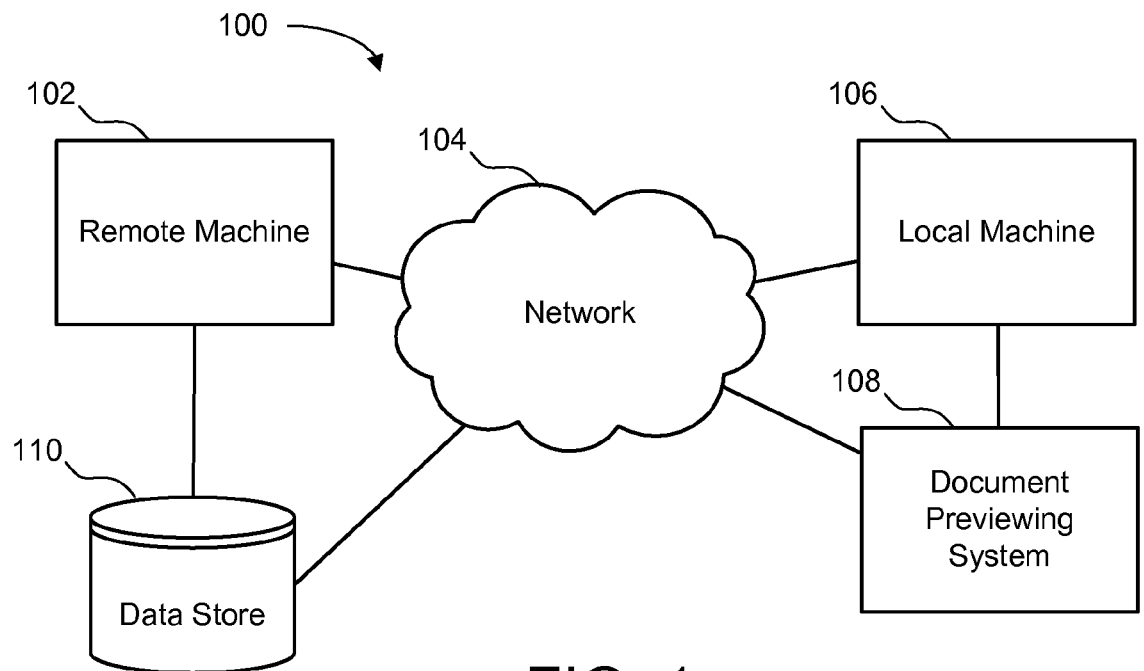
FIG. 1 depicts a schematic diagram of one embodiment of a system for downloading documents.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate previewing remote documents efficiently by reducing unnecessary and sometimes costly downloads. Documents and data sets downloaded over a network may be extremely large. Downloading large documents takes time, occupies bandwidth, and may be costly for users with restrictive download limits. In many instances, a user may be interested only in a small portion of the document or data set, making much of the download unnecessary.

In some conventional methods, downloading a large document or data set involves downloading only the first portion of the document. In some instances, the document continues downloading automatically. In other instances, as the user scrolls or navigates through the document, the scrolling prompts the local machine to continue downloading the document. In many instances, the size and position of a scroll box within a scroll bar is estimated to give the impression to the user that the entire document has been downloaded onto a local machine when only the first portion has been downloaded. While this conventional method solves problems inherent in downloading large documents and data sets, there are still problems that the conventional method does not solve. When a user is interested only in a portion of the document, the user may unnecessarily download large segments of the document. In the case where the interested portion is located at the end of a document, the user may need to download the entire document scrolling to the end because the user cannot tell where to navigate in the local document. In another case, the user may know the desired portion is located in the middle of a document and may blindly scroll halfway down the document only to realize the user downloaded an unwanted portion. The user is unable to tell where to navigate in the local document. Downloading the unwanted portions may prove costly and may accelerate reaching download limits.

Some embodiments described herein involve first downloading an outline of a document or data set. In some embodiments, the outline may include prominent features of the document or data set and may include filler content or filler data in between the prominent features. The prominent features or outline features allow the user to recognize the content not yet downloaded and the location of the content within the document. Some embodiments reduce the time to download by limiting the size of the outline. Some embodiments allow the user to navigate through the document or data set, browsing through the outline features. Some embodiments reduce unnecessary downloads by downloading only the content corresponding to the outline feature displayed when the user stops navigating. In some embodiments, the user will not download the entire document as the user scrolls through the document and the user will not blindly download portions of the document. First downloading an outline of a document reduces the time to download and saves bandwidth. The outline features allow the user to quickly and accurately locate and download only the desired portions of the document. Reducing unnecessary downloads save time, money, and bandwidth. Quickly finding the desired portion of a document or data set reduces user frustration and increases user satisfaction.

FIG. 1 depicts a schematic diagram of one embodiment of a system for downloading documents 100. The system for downloading documents 100 includes a remote machine 102, a network 104, a local machine 106, a document previewing system 108, and a data store 110. The system 100 efficiently transfers documents and data sets from the data store 110 or the remote machine 102 to the local machine 106.

In some embodiments, the document or data set is stored on the remote machine 102. The remote machine 102 may be a single device or a combination of devices. The remote machine 102 may be a computer or other device connected to the network 104. The local machine 106 may be a mobile phone, a smart phone, a portable media device, a tablet computer, a laptop computer, a desktop computer or other device connected to the network 104. In some embodiments, the network 104 may be at least in part the internet. In other embodiments, the network 104 may be a private network or an intranet. In some embodiments the document previewing system 108, the remote machine 102, the local machine 106, and the data store 110 may be directly linked to one another. For example the remote machine 102 and the local machine 106 may be directly linked together along with the document previewing system 108. The local machine 106 may directly communicate with the remote machine 102 or may communicate over the network 104.

In some embodiments, the document or data set is stored in the data store 110. In some embodiments, the document previewing system 108 accesses the document from the remote machine 102. In other embodiments, the document previewing system 108 accesses the document from the data store 110. The document previewing system 108 may be a single device or a combination of devices.

The document previewing system 108 may be a mobile phone, a smart phone, a portable media device, a tablet computer, a laptop computer, a desktop computer, or other device, or a combination of devices. Although the system 100 is shown and described with certain components and functionality, other embodiments of the system 100 may include fewer or more components to implement less or more functionality.

Figure 2:
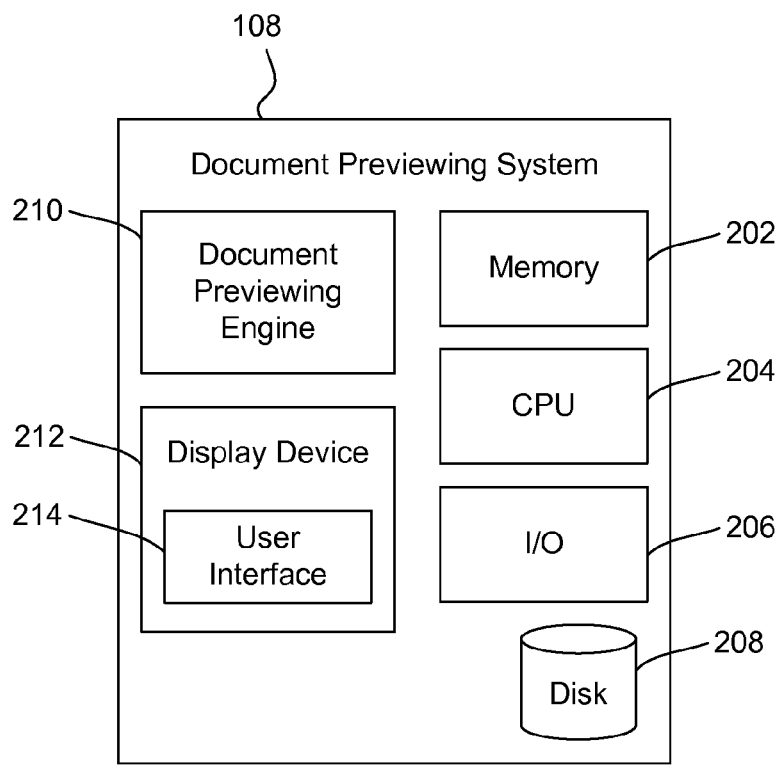
FIG. 2 depicts a schematic diagram of one embodiment of the document previewing system of FIG. 1.

FIG. 2 depicts a schematic diagram of one embodiment of the document previewing system 108 of FIG. 1. The depicted document previewing system 108 includes various components, described below, that are capable of performing the functions and operations described herein. The illustrated document previewing system 108 includes a computer memory device 202, a processing device 204, input/output devices 206, and a disk storage device 208. The illustrated document previewing system 108 also includes a document previewing engine 210 and a display device 212. Some or all of the components of the document previewing system 108 may be stored on a single computing device or on a network of computing devices, including a wireless communication network. In some embodiments, some or all of the components of the document previewing system 108 are stored on the local machine 106. In other embodiments, some or all of the components of the document previewing system 108 are stored on the remote machine 102 or on another device. The document previewing system 108 may be a single device such as a mobile phone, a smart phone, a portable media device, a tablet computer, a laptop computer, a desktop computer, or other device or a combination of devices. Although the document previewing system 108 is shown and described with certain components and functionality, other embodiments of the document previewing system 108 may include fewer or more components to implement less or more functionality.

The computer memory device 202 may store data and/or software instructions or computer program instructions for carrying out the operations described herein. The computer memory device 202 may be external or internal to the system and may include but is not limited to a hard drive, a CD/DVD recordable drive, a magnetic tape drive, a disk cartridge drive, a secure digital card, another type of magnetic or optical drive, a solid-state drive, or another type of memory device. The processing device 204 is connected to and in communication with the memory device 202 and may store and access data on the memory device 202 for performing the operations described herein. The processor or processing device 204 may also be connected to the disk storage device 208. The disk storage device 208 may be implemented to temporarily store data or software instructions from the memory device 202 or the processor 204. The disk storage device 208 may include but is not limited to a hard disk drive, a floppy disk drive, a removable floppy disk, or other type of optical or magnetic drive. The functionality of the document previewing engine 210 may be implemented by computer program instructions stored on the computer memory device 202 and executed by the processing device 204 such as a CPU.

A user interface 214 is displayed on the display device 212. The display device 212 may be any display device 212 for a computing device. The user interface 214 may be part of an operating system for the computing device and may allow a user to interact with the operating system. The operations described herein may be associated with one or more applications configured to operate within the operating system. In some embodiments, the display device 212 and the user interface 214 are part of the local machine 106.

In some embodiments, the document previewing engine 210 is configured to download an outline of a document comprising outline features and filler content in between the outline features. In some embodiments, the filler content replaces secondary content of the document. In order to limit the amount of data downloaded, the filler content replaces the secondary content of the document or data set. In some embodiments, the filler content is stored on the local machine 106 in order to limit the amount of data downloaded. The filler content may occupy the same amount of space as the secondary data to accurately portray the amount of secondary data that is downloaded. In some embodiments, the document previewing engine 210 is further configured to display the outline on the display device. The document previewing engine 210 may be further configured to download the secondary content corresponding to an outline feature in response to a user navigating to the outline feature and the outline feature displaying on the display device for a period of time.

In some embodiments, the outline includes outline features of the document or data set. In some embodiments, the outline features are only the prominent features of the document or data set. The outline features may be section headings, subsection headings, the first sentence of a section, images, chapter headings, data field headings, page indicators, titles, abstraction index, words, cell headings, or other features of a document or data set recognizable to a user. In some embodiments, the outline features allow the user to easily recognize the portion of the document or data set that the user wants to download without downloading the rest of the document or data set. The outline features or recognizable items allow the user to understand the skeletal structure of the document or data set without downloading the entire document or data set. In some embodiments, the outline features are spaced throughout the document or data set with filler content in between the outline features replacing the content corresponding to each outline feature. For example, the outline features may be the section headings of a report. The initial download will include only the section headings of the report with fake text replacing the body of the report. The user may navigate through the outline by scrolling and reading the section headings. As the user stops navigating at a section heading the body of the paper corresponding to the section heading will be downloaded and replace the fake text initially loaded with the outline. The fake text may be another type of filler content such as images, lines, graphics, white space, or space. In this example, the user will only download the sections of the paper that interest the user instead of downloading the entire paper as the user scrolls through the paper, thus reducing unnecessary downloads and freeing bandwidth.

In some embodiments, the document previewing engine 210 is further configured to display a scroll preview box during navigation, and display the outline of the document in the scroll preview box. The scroll preview box may be smaller in size than the document allowing the initial download to be lower resolution and ultimately a lower data amount. In some embodiments, the outline is displayed only in the scroll preview box. In some embodiments, the document previewing engine 210 is further configured to display the scroll preview box only during navigation. Navigation may be scrolling through a data set or document by use of a mouse, a scroll bar, keyboard keys, an input gesture on a touch sensitive screen, or other means well known.

In some embodiments, the outline includes a first outline feature of the document and a first filler content that replaces a first secondary content corresponding to the first outline feature of the document. In some embodiments, the outline further includes a second outline feature of the document, and a second filler content that replaces a second secondary content corresponding to the second outline feature. In some embodiments, the filler content is between the outline features. The document previewing engine 210 may be further configured to download the first secondary content in response to the user navigating to the first outline feature and the first outline feature displaying on the display device for a period of time.

The document previewing engine 210 may be further configured to display the outline in a document viewer. In some embodiments, the document viewer includes a scroll bar and a scroll box. The document previewing engine 210 may be further configured to link the secondary content to a position of the scroll box within the scroll bar, and download the secondary content in response to the user sliding the scroll box to the position and the scroll box remaining in the position for a period of time.

In addition to the advantages which may be achieved by implementation of the individual components of the document previewing system 108, some embodiments of the document previewing system 108 provide additional advantages over conventional technology. For example, some embodiments of the document previewing system 108 allow a user to quickly download an outline of a document or data set. The outline allows a user to quickly identify only the portions of the document or data set relevant to the user's query. Some embodiments reduce or eliminate the possibility of an error in downloading data not desired and reduce the amount of data downloaded as well as decrease costs and increase available bandwidth.

Figure 3:
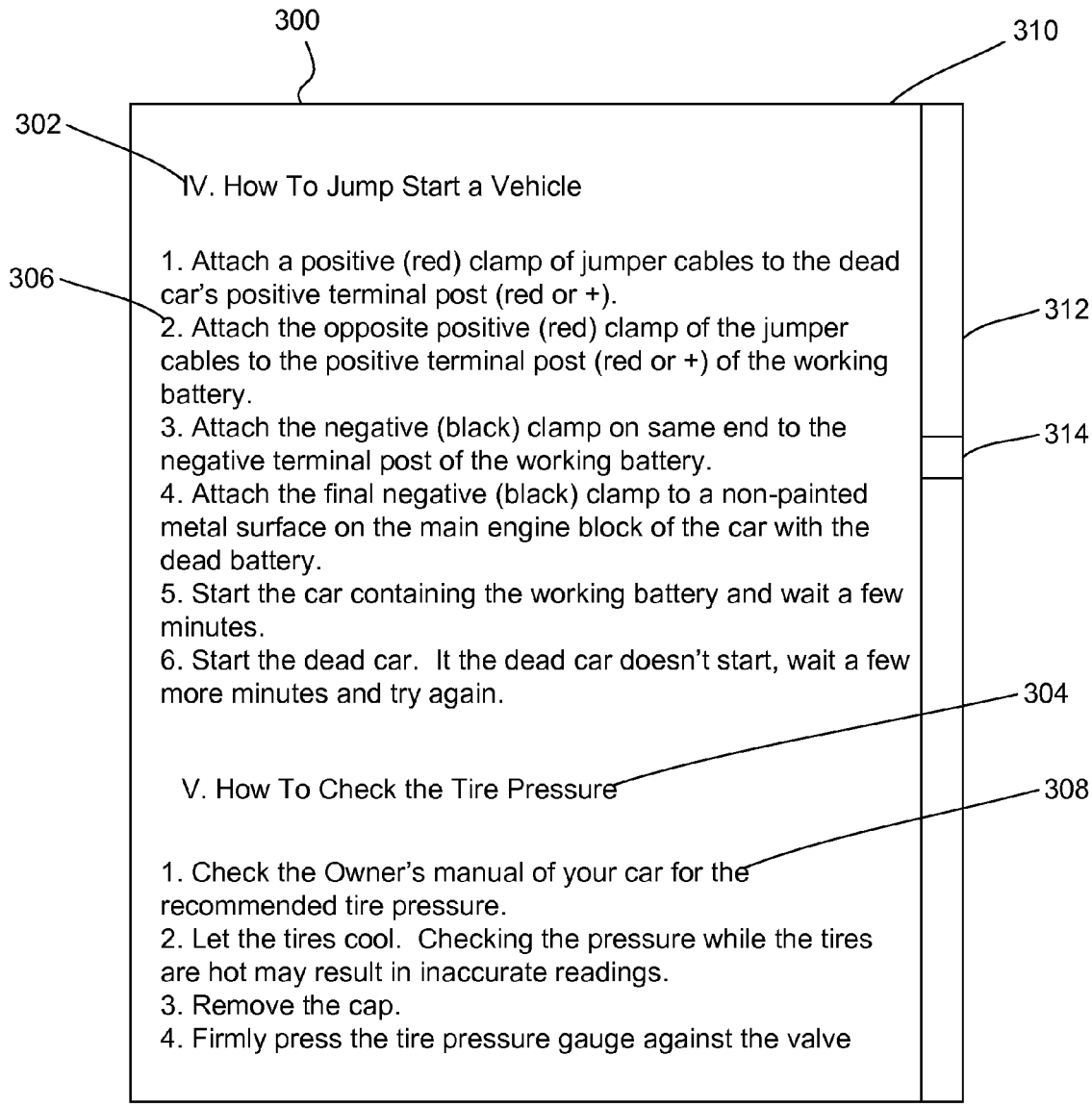
FIG. 3 depicts one embodiment of a document including outline features and secondary content.

FIG. 3 depicts one embodiment of a document 300 including outline features 302-304 and secondary content 306-308. In some embodiments, the document 300 may be a data set. The document 300, in some embodiments, includes outline features 302-304. Some embodiments include secondary content 306-308. In FIG. 3, the secondary content 306 corresponds to the outline feature 302 and the secondary content 308 corresponds to the outline feature 304. The content of the document 300 relates to maintenance of a car. A user may be interested only in a portion of the comprehensive document 300. Downloading the entire document 300 onto a local machine 106 may be unnecessarily expensive depending on a data plan and may be time consuming. Some embodiments allow the user to initially download only the outline features 302-304 of the document 300. The user then may scroll or navigate through the document 300 to find the outline feature 302-304 that the user desires before downloading. Some embodiments include a document viewer 310. In some embodiments the document viewer 310 includes a scroll bar 312, and a scroll box 314 to assist in navigation of the document 300. In some embodiments, the location of the content of the document or data set is mapped onto the position of the scroll box 314 within the scroll bar 312. FIG. 3 shows the scroll box 314 short of halfway down the scroll bar 312 and the content of the document 302-308 displayed for the position.

Figure 4:
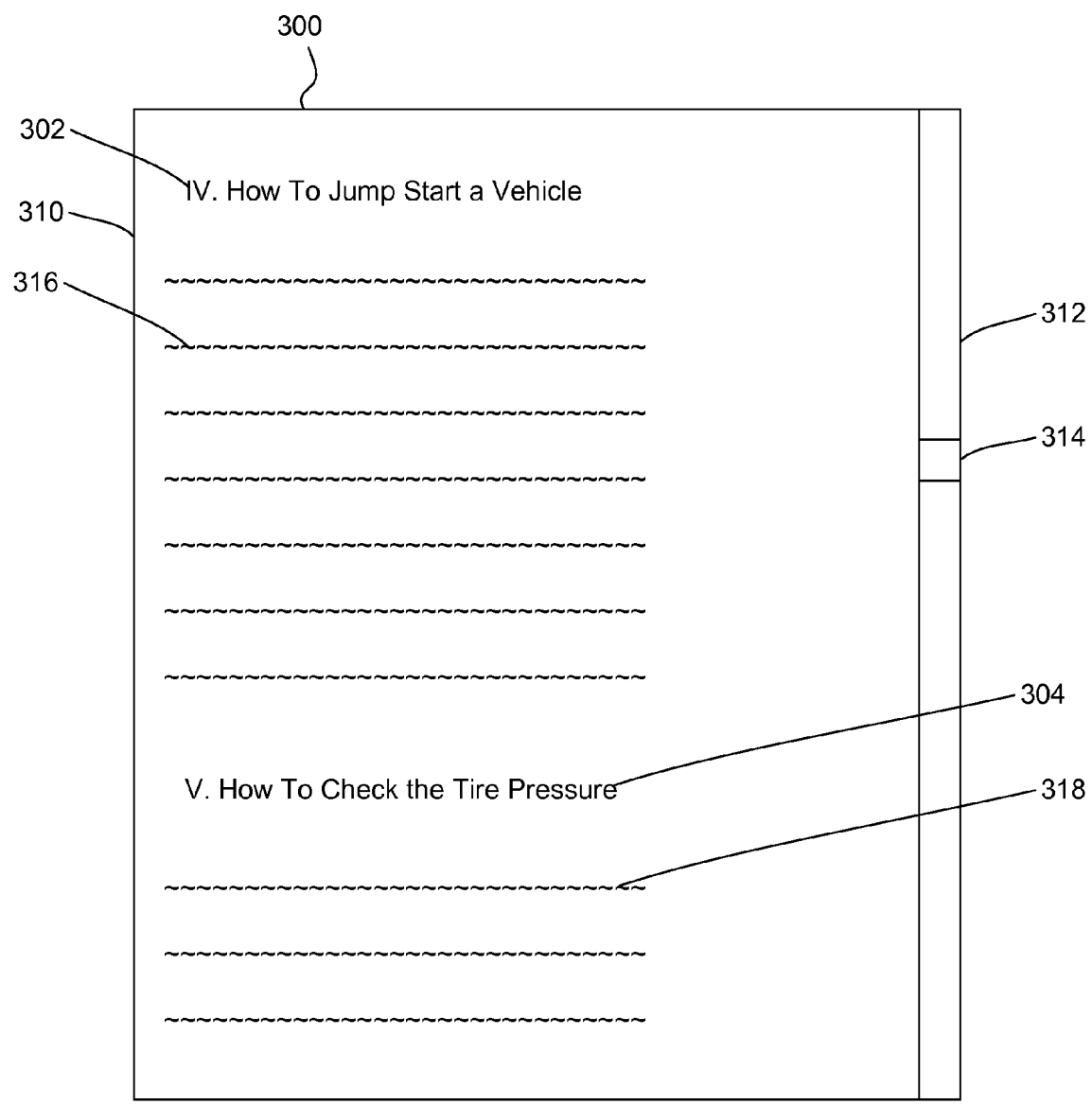

FIG. 4 depicts one embodiment of an initial download of document 300 of FIG. 3 including outline features 302 and 304 and filler content 316 and 318. In some embodiments, the initial download includes an outline of the document 300. The outline includes the outline features 302 and 304. In some embodiments, the outline includes filler content 316 and 318 in place of the secondary content 306 and 308 of the document 300. The filler content 316 and 318 replaces the secondary content 306 and 308 on the initial download decreasing the amount of data downloaded and the bandwidth occupied. In some embodiments, the filler content 316 and 318 is downloaded with the outline features 302 and 304. In some embodiments, the filler content 316 and 318 is already stored on the local machine 106. In some embodiments, the application used to view the document 300 designates the amount of filler content 316 and displayed. In some embodiments, the download directs the amount of filler content 316 and 318 to be displayed with the each outline feature 302 and 304. The user may navigate through the document 300 by use of the scroll box 314 and scroll bar 312 or in another known method for navigating through a document or data set. As the user navigates, the display changes showing various outline features 302 and 304. In some embodiments, as the user locates the interested outline feature 302 and stops navigating the secondary content 306, shown in FIG. 3, which corresponds to the outline feature 302 is downloaded. In some embodiments, the second download occurs in response to the outline feature 302 displaying on the display device 212 for a period of time. In some embodiments, the outline feature 302 must occupy a certain location on the display to initiate the second download. In some embodiments, the filler content 316 and 318 may be fake text, lines, graphics, images, white space, or other representation of the secondary content 306 and 308 which corresponds to the outline feature 302 and 304. FIG. 4 depicts one embodiment of the document 300 after the initial download and FIG. 3 depicts the document 300 after the download of secondary content 306 and 308.

Figure 5:
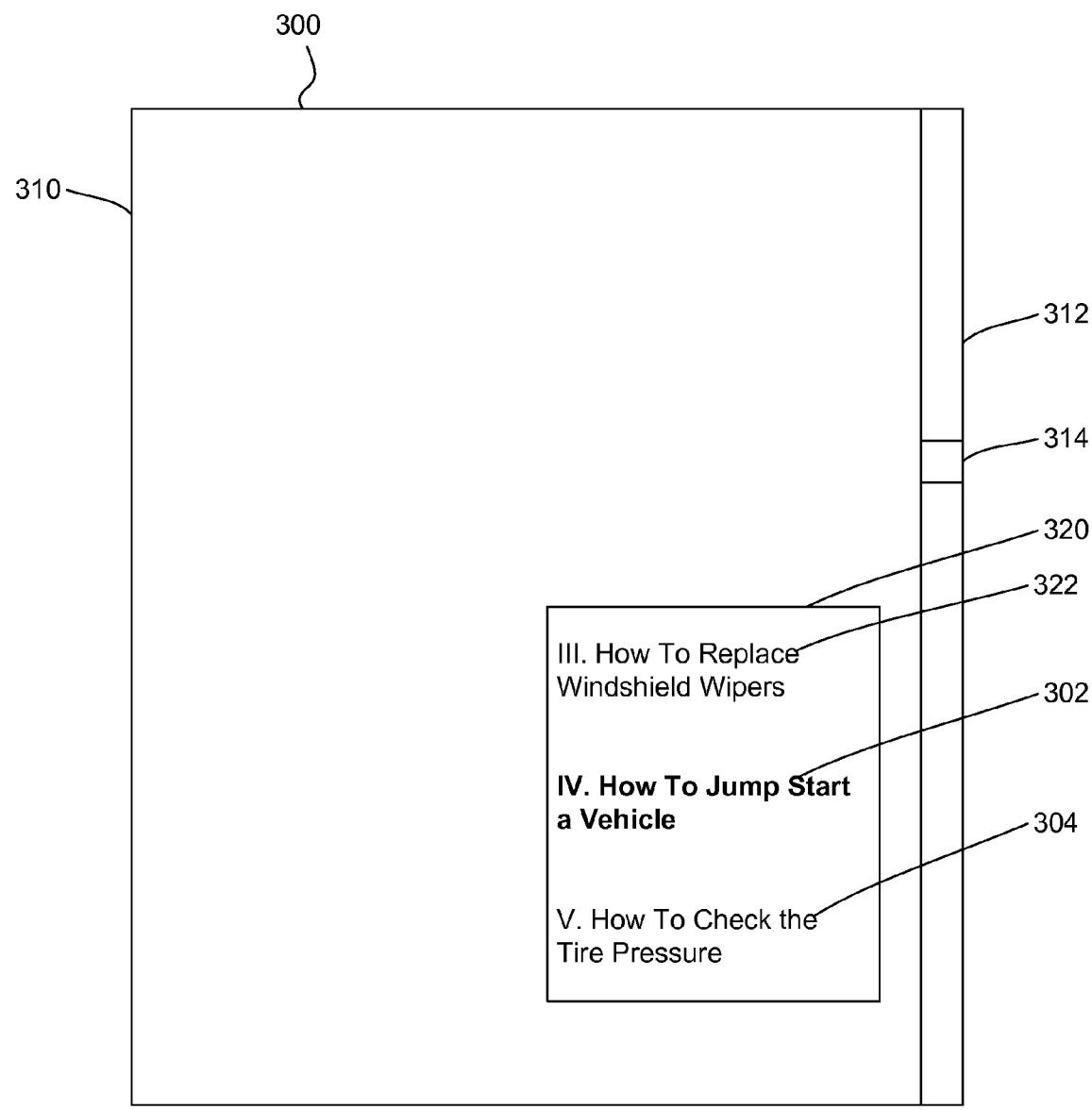
FIG. 5 depicts another embodiment of an initial download of the document of FIG. 3 including the outline features displayed in a scroll preview box.

FIG. 5 depicts another embodiment of an initial download of the document 300 of FIG. 3 including outline features 302, 304, and 322 displayed in a scroll preview box 320. In some embodiments the outline features 302, 304, and 322 are displayed in the scroll preview box 320. Some embodiments include filler content 316 and 318, shown in FIG. 4, in the scroll preview box 320. In some embodiments, the scroll preview box 320 displays during navigation. In some embodiments, the scroll preview box 320 displays the outline feature 302 corresponding to the secondary content 306 that is set to be downloaded upon stopping navigation. The outline feature 302 may be visually emphasized. In some embodiments, the outline feature 304 directly after the designated outline feature 302 and the outline feature 322 directly before the designated outline feature 302 are also displayed in the scroll preview box 320 allowing the user to locate the desired portions of the document 300 or data set. In response to the user stopping navigation, the secondary content 306 that corresponds to the outline feature 302 displayed in the scroll preview box may be downloaded and displayed on the display device 212.

Figure 6:
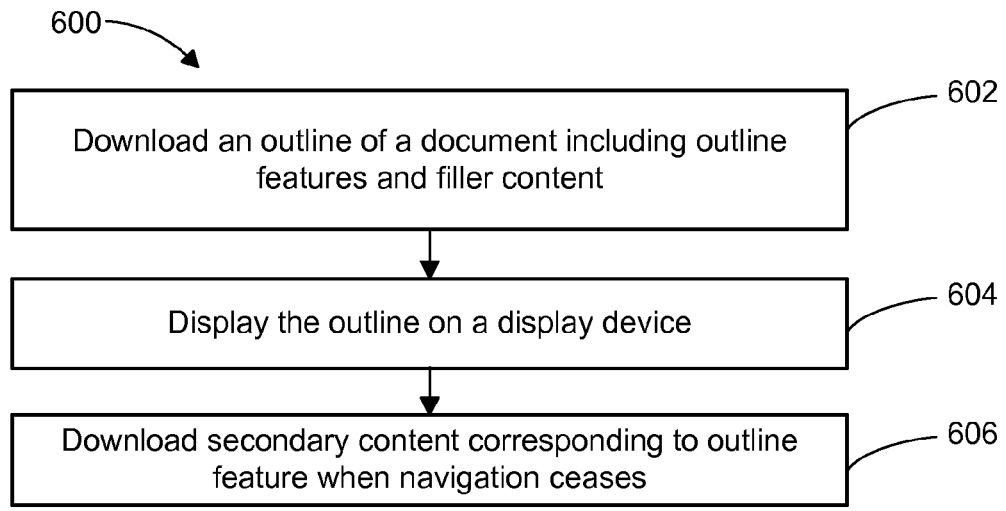
FIG. 6 depicts a flow chart diagram of one embodiment of a method for previewing remote documents.

FIG. 6 depicts a flow chart diagram of one embodiment of a method for previewing remote documents 600. Although the method for previewing remote documents 600 is described in conjunction with the document previewing system 108 of FIG. 1 and the document 300 of FIGS. 3-5, embodiments of the method for previewing remote documents 600 may be implemented with other types of computer systems.

At 602, an outline of a document 300 is downloaded including outline features 302 and 304 and filler content 316 and 318. In some embodiments, the filler content 316 and 318 replaces the secondary content 306 and 308 of the document 300. At 604, the outline of the document 300 is displayed on the display device 212. At 606, the secondary content 306 corresponding to the outline feature 302 is downloaded in response to the user navigating to the outline feature 302 and the outline feature 302 displaying on the display device 212 for a period of time. The depicted method for previewing remote documents 600 then ends.

In some embodiments, the outline features 302 and 304 may be section headings, subsection headings, sentences, images, cell entries, titles, chapter headings, page indicators, or another subset of the content of the data set or document 300. The filler content 316 and 318 may be fake text, lines, space, images, graphics, or another representation of the secondary content 306 and 308.

In some embodiments, the outline includes a first outline feature 302 of the document 300, and a first filler content 316 that replaces a first secondary content 306 corresponding to the first outline feature 302 of the document 300. In some embodiments, the outline further includes a second outline feature 304 of the document 300, and a second filler content 318 that replaces a second secondary content 308 corresponding to the second outline feature 304. In some embodiments, the filler content 316 is between the outline features 302 and 304. In some embodiments, the method 600 includes downloading the first secondary content 306 in response to the user navigating to the first outline feature 302 and the first outline feature 302 displaying on the display device 212 for a period of time.

In some embodiments, the method 600 includes displaying a scroll preview box 320 during navigation, and displaying the outline of the document 300 in the scroll preview box 320. In some embodiments, the method 600 includes displaying the outline in a document viewer 310. The document viewer 310 may include a scroll bar 312 and a scroll box 314. The method 600 may further include linking the secondary content 306 and 308 to a position of the scroll box 314 within the scroll bar 312, and downloading the secondary content 306 in response to the user sliding the scroll box 314 to the position and the scroll box 314 remaining in the position for a period of time.

Figure 7:
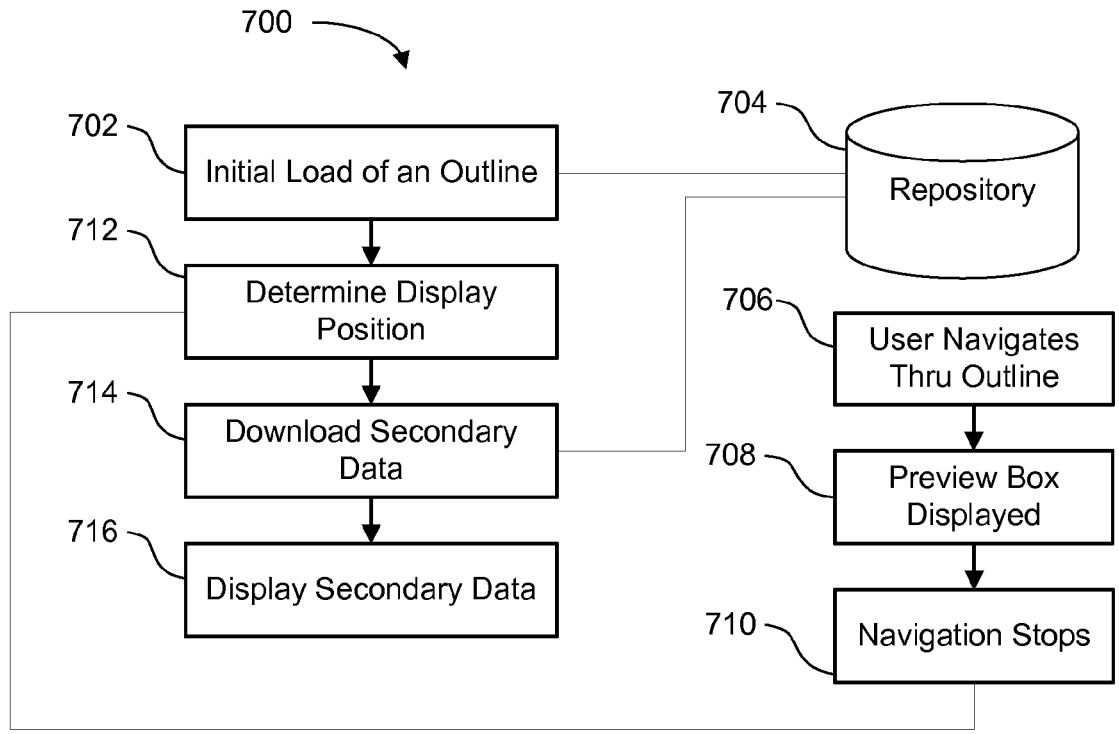
FIG. 7 depicts a flow chart diagram of another embodiment of a method for previewing remote documents.

FIG. 7 depicts a flow chart diagram of another embodiment of a method for previewing remote documents 700. Although the method for previewing remote documents 700 is described in conjunction with the document previewing system 108 of FIG. 1 and the document 300 of FIGS. 3-5, embodiments of the method for previewing remote documents 700 may be implemented with other types of computer systems.

In one embodiment, the document previewing engine 210 loads 702 an initial outline of a document 300 or data from a repository 704. The user then navigates 706 through the outline. In some embodiments, during navigation a preview box 320 is displayed 708 and may contain the outline. When navigation stops 710, the display position is determined 712, and the document previewing engine 210 loads 714 the secondary data 306. The secondary data 306 is then displayed 716 with the outline.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a system for downloading documents includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer usable storage medium for execution by a computer. As an example, an embodiment of a computer program product includes a computer usable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising a non-transitory computer useable storage medium including a computer readable program, wherein the computer readable program includes instructions that, when executed by a processing device within a computer, cause the computer to perform operations comprising:
    downloading an outline of a document comprising outline features and a plurality of filler content in between the outline features, wherein each filler content corresponds to one outline feature, wherein the plurality of filler content replaces a plurality of secondary content of the document, wherein each secondary content corresponds to a particular filler content and one outline feature;
    displaying a portion of the outline on a display device;
    receiving an input to navigate through the outline and not downloading any secondary content during navigation through outline feature and filler content; and
    only downloading secondary content corresponding to a particular outline feature in response to a user navigating to the particular outline feature and the particular outline feature displaying on the display device for a predetermined period of time.

2. The computer program product of claim 1, wherein the outline features comprise section headings of the document, and wherein the downloading the secondary content corresponding to the particular outline feature initiates only when the particular outline feature occupies a certain location on the display.

3. The computer program product of claim 1, wherein the outline comprises a first outline feature of the document, a first filler content that replaces a first secondary content corresponding to the first outline feature of the document, a second outline feature of the document, and a second filler content that replaces a second secondary content corresponding to the second outline feature, wherein the first filler content is between the first outline feature and the second outline feature; and wherein the operations further comprise not downloading the first secondary content and only downloading the second secondary content in response to the user navigating to the second outline feature and the second outline feature displaying on the display device for a predetermined period of time.

4. The computer program product of claim 1, wherein the filler content is white space.

5. The computer program product of claim 1, wherein the operations further comprise:
    displaying a scroll preview box during navigation; and
    displaying a portion of the outline of the document in the scroll preview box.

6. The computer program product of claim 1, wherein the operations further comprise:
    displaying the outline in a document viewer, wherein the document viewer comprises a scroll bar and a scroll box;
    linking the secondary content to a position of the scroll box within the scroll bar; and downloading the secondary content in response to the user sliding the scroll box to the position and the scroll box remaining in the position for a predetermined period of time.

7. The computer program product of claim 1, wherein the filler content is fake text.

8. A method for previewing remote documents comprising:
downloading an outline of a document comprising outline features and a plurality of filler content in between the outline features, wherein each filler content corresponds to one outline feature, wherein the plurality of filler content replaces a plurality of secondary content of the document, wherein each secondary content corresponds to a particular filler content and one outline feature;
displaying a portion of the outline on a display device;
receiving an input to navigate through the outline and not downloading any secondary content during navigation through outline feature and filler content; and
only downloading secondary content corresponding to a particular outline feature in response to a user navigating to the particular outline feature and the particular outline feature displaying on the display device for a predetermined period of time.

9. The method of claim 8, wherein the outline features comprise section headings of the document, and wherein the downloading the secondary content corresponding to the particular outline feature initiates only when the particular outline feature occupies a certain location on the display.

10. The method of claim 8, wherein the filler content is white space.

11. The method of claim 8, wherein the outline comprises a first outline feature of the document, a first filler content that replaces a first secondary content corresponding to the first outline feature of the document, a second outline feature of the document, and a second filler content that replaces a second secondary content corresponding to the second outline feature, wherein the first filler content is between the first outline feature and the second outline feature; and wherein the operations further comprise not downloading the first secondary content and only downloading the second secondary content in response to the user navigating to the second outline feature and the second outline feature displaying on the display device for a predetermined period of time.

12. The method of claim 8, wherein the method further comprises:
displaying a scroll preview box during navigation; and
displaying a portion of the outline of the document in the scroll preview box.

13. The method of claim 8, wherein the method further comprises:
displaying the outline in a document viewer, wherein the document viewer comprises a scroll bar and a scroll box;
linking the secondary content to a position of the scroll box within the scroll bar; and
downloading the secondary content in response to the user sliding the scroll box to the position and the scroll box remaining in the position for a predetermined period of time.

14. The method of claim 8, wherein the filler content is fake text.

15. A document previewing system comprising:
a display device comprising a user interface, and
a document previewing engine coupled to the display device, the document previewing engine configured to:
download an outline of a document comprising outline features and a plurality of filler content in between the outline features, wherein each filler content corresponds to one outline feature, wherein the plurality of filler content replaces secondary content of the document, wherein each secondary content corresponds to a particular filler content and one outline feature;
display a portion of the outline on the display device;
receive an input to navigate through the outline and not downloading any secondary content during navigation through outline feature and filler content; and
only download secondary content corresponding to a particular outline feature in response to a user navigating to the particular outline feature and the particular outline feature displaying on the display device for a predetermined period of time.

16. The system of claim 15, wherein the outline comprises a first outline feature of the document, a first filler content that replaces a first secondary content corresponding to the first outline feature of the document, a second outline feature of the document, and a second filler content that replaces a second secondary content corresponding to the second outline feature, wherein the first filler content is between the first outline feature and the second outline feature; and wherein the document previewing engine is further configured to not download the first secondary content and only downloading the secondary content in response to the user navigating to the second outline feature and the second outline feature displaying on the display device for a predetermined period of time.

17. The system of claim 15, wherein the document previewing engine is further configured to:
display a scroll preview box during navigation; and
display a portion of the outline of the document in the scroll preview box.

18. The system of claim 15, wherein the document previewing engine is further configured to:
display the outline in a document viewer, wherein the document viewer comprises a scroll bar and a scroll box;
link the secondary content to a position of the scroll box within the scroll bar; and
download the secondary content in response to the user sliding the scroll box to the position and the scroll box remaining in the position for a predetermined period of time.

19. The system of claim 15, wherein the outline features comprise section headings of the document, and wherein the downloading the secondary content corresponding to the particular outline feature initiates only when the particular outline feature occupies a certain location on the display.

20. The system of claim 15, wherein the filler content is fake text.

* * * * *